United States Patent
Schmidt et al.

(10) Patent No.: US 6,371,431 B1
(45) Date of Patent: Apr. 16, 2002

(54) ADJUSTING DEVICE FOR A LENGTHWISE ADJUSTABLE VEHICLE SEAT

(75) Inventors: Bernd Schmidt, Wildberg; Ralf-Henning Schrom, Rottenburg, both of (DE); Philip C. Shephard, Birmingham (GB); Petros Velimvassakis, Karlsruhe (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/520,799

(22) Filed: Mar. 8, 2000

(30) Foreign Application Priority Data

Mar. 8, 1999 (DE) .......................... 199 10 080

(51) Int. Cl.$^7$ .............................. F16M 13/00
(52) U.S. Cl. .................. 248/419; 74/110; 248/420; 248/421; 248/429; 338/164
(58) Field of Search ................ 248/419, 420, 248/421, 429, 157, 422, 424, 394; 297/330, 344.15, 344.17; 74/110

(56) References Cited

U.S. PATENT DOCUMENTS

| 2,919,744 A | | 1/1960 | Tanaka ..................... 155/14 |
| --- | --- | --- | --- |
| 3,188,044 A | | 6/1965 | Epple ..................... 248/419 |
| 4,010,927 A | * | 3/1977 | Pickles ..................... 248/420 |
| 4,767,157 A | * | 8/1988 | Kazaoka et al. ............ 297/322 |
| 4,840,427 A | * | 6/1989 | Hong ..................... 248/419 X |
| 4,871,137 A | * | 10/1989 | Ikegaya ..................... 248/396 |
| 5,112,018 A | * | 5/1992 | Wahls ..................... 248/394 |
| 5,730,411 A | * | 3/1998 | Pawlowicz et al. ......... 248/421 |
| 5,967,471 A | * | 10/1999 | Borlinghaus et al. ... 248/419 X |

FOREIGN PATENT DOCUMENTS

| EP | 0 238 234 | 9/1987 |
| --- | --- | --- |
| JP | 60-67234 | 4/1985 |

* cited by examiner

*Primary Examiner*—Anita King
*Assistant Examiner*—Tan Le
(74) *Attorney, Agent, or Firm*—Crowell & Moring LLP

(57) ABSTRACT

A height adjusting device for a lengthwise adjustable vehicle seat is provided. Pivotal control arm units are provided at front and rear position of a vehicle seat to raise and lower the seat in dependance on their rotative position Link assembles, including front and rear coupling arms pivotally connected by an intermediate joint connect the front and rear control arm units.

19 Claims, 3 Drawing Sheets

ADJUSTING DEVICE FOR A LENGTHWISE ADJUSTABLE VEHICLE SEAT

BACKGROUND AND SUMMARY OF THE INVENTION

This application claims the priority of Germany Patent Document No. 199 10 080.2, filed Mar. 8, 1999, the disclosures of which is expressly incorporated by reference herein.

The invention relates to an adjusting device for a lengthwise adjustable vehicle seat with control arms for vertical adjustment of the seat.

In an adjusting device of this kind found in U.S. Pat. No. 2,919,744, control arms are provided on both sides at front and rear on lengthwise-adjustable support rails with, which arms a seat frame is articulated to the seat underframe. The corresponding lever arms of the front and rear control arms are each connected by links with one another, with each of the links comprising two coupling arms articulated to one another. The intermediate links of the total of four links are supported in a displaceably movable fashion on guide rails integral with the body. For vertical and lengthwise adjustment, a drive device with a drive fastened to the vehicle floor is provided, by which drive spindles running in the corresponding guide rails can be operated synchronously through associated drive cables. By means of the two spindles, the two intermediate links displaceably guided on the common guide rails are adjustable lengthwise along guide slots in the guide rails with the intermediate links being connected by an associated spindle nut that meshes with the spindle. The seat is adjusted lengthwise by the two spindles with an additional spindle associated with them being connected by a bracket with the lengthwise-adjustable support rails. To prevent lengthwise adjustment of the seat from taking place upon a vertical adjustment, the spindle nuts can be uncoupled from the associated brackets.

One of the disadvantages of this arrangement is that the vertical adjustment device is operated by a common drive device with the lengthwise adjustment device located on the body. This produces an adjustment device that requires a great deal of space, construction, and maintenance.

European Patent Document EP 0 238 234 A1 shows an adjusting device of this kind for vertical adjustment of the seat with control arms mounted on each side at the front and rear on the underframe of the seat, said arms having a link as the connection between the laterally corresponding control arms of the front and rear arms that requires a great deal of space especially in the comfort area of the seat cushion during its movement in the vertical adjustment of the vehicle seat. For coupling the four control arms, the front pair of control arms is nonrotatably connected with a manually drivable connecting rod. The links require a great deal of space during their movement in the vertical adjustment of the vehicle seat, especially in the comfort area of the seat cushion. To ensure adequate seating comfort for the occupants, the seat cushion part must be made relatively thick or located in a raised position relative to the seat frame.

A goal of the invention is therefore to provide an adjusting device of the above discussed general type, with a reduced space requirement and lower construction and maintenance costs.

This goal is achieved according to the invention by an adjusting device for a lengthwise adjustable vehicle seat comprising:

control arm units mounted on both sides at front and rear ends on a seat underframe for vertical adjustment of the vehicle seat, with which a seat frame is articulated on the seat underframe, corresponding control arms of the front and rear control arm units being connected with one another by a link assembly, each link assembly comprising two coupling arms articulated to one another at an intermediate joint supported so that it can move displaceably on the seat underframe, and a drive device operable to drive all the control arms in a pivotally movable fashion wherein the intermediate joints are each displaceably guided on the seat underframe, wherein the drive device for coupling the control arm units at opposite lateral sides of the seat comprises a transverse rod on which an associated pair of control arm units is nonrotatably mounted, and wherein the drive device has a drive associated with it which is fastened to the seat underframe.

In the adjusting device according to the invention, each of the links comprises two coupling arms connected with one another with articulation, whose intermediate joint is supported on the lengthwise-adjustable seat underframe in a displaceably guided fashion. The drive for vertical adjustment, independent of the drive for lengthwise adjustment, moves together with the lengthwise-adjustable seat underframe and is fastened thereto, permitting a simple method of driving the adjusting device. For simple coupling of the four control arms that is as maintenance-free as possible, the front or rear driven pair of control arms is mounted nonrotatably on a transverse rod.

With this arrangement of the link lowered in the middle area, the comfort range of the seat cushion is increased and the support of the seat frame on the seat underframe is improved. In particular, the bending moments that act on the links during the vertical adjustment or in an accident are accepted not only by the support of the intermediate links on the seat underframe but also by the two-piece design of the links with the two coupling arms in an improved fashion. The intermediate links during their displacement movement can then travel in both a linear and an arcuate path.

A compensating link articulated between the front control arm and the seat frame serves in particular to receive forces acting on the seat frame, for example as a result of vibrations or vertical adjustment.

In addition, it has been found to be advantageous to mount the front and rear control arms pivotally on the associated lengthwise adjustable support rails of the seat underframe and to support the corresponding intermediate joints on the supporting rails, producing an especially good support for the seat frame on the seat underframe and an adjusting device that saves space in general.

In the particular case of an integral seat it has been found to be advantageous for the intermediate joints in each lengthwise adjusted position of the vehicle seat to be supported in the overlapping area with the guide rails that are integral with the vehicle. As a result, high forces that result for example from the tensile force of a belt on an integral seat in an accident and are introduced from the adjusting device through the support rails into the guide rails and then into the vehicle floor.

Finally, it has been found to be advantageous to provide laterally mounted relief springs to support the lifting movement of the seat frame in order in this way to relieve the load on the drive motor or provide it with smaller dimensions.

Other objects, advantages and novel features of the present invention will become apparent from the following detailed description of the invention when considered in conjunction with the accompanying drawings.

DETAILED DESCRIPTION OF THE DRAWINGS

Figure 1:
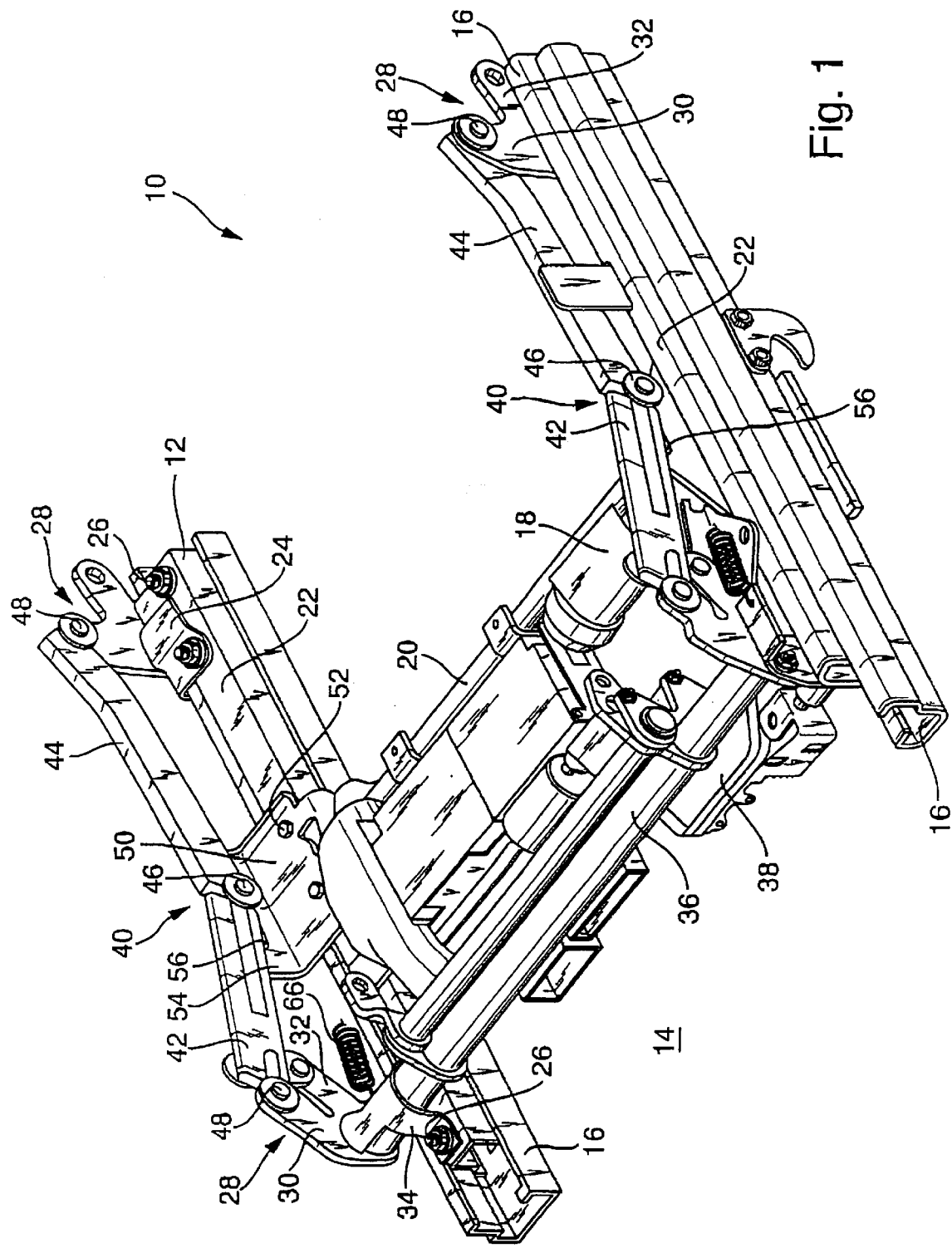
FIG. 1 is a perspective view of a seat underframe of a vehicle seat with an adjusting device according to a preferred embodiment of the invention.
Figure 2:
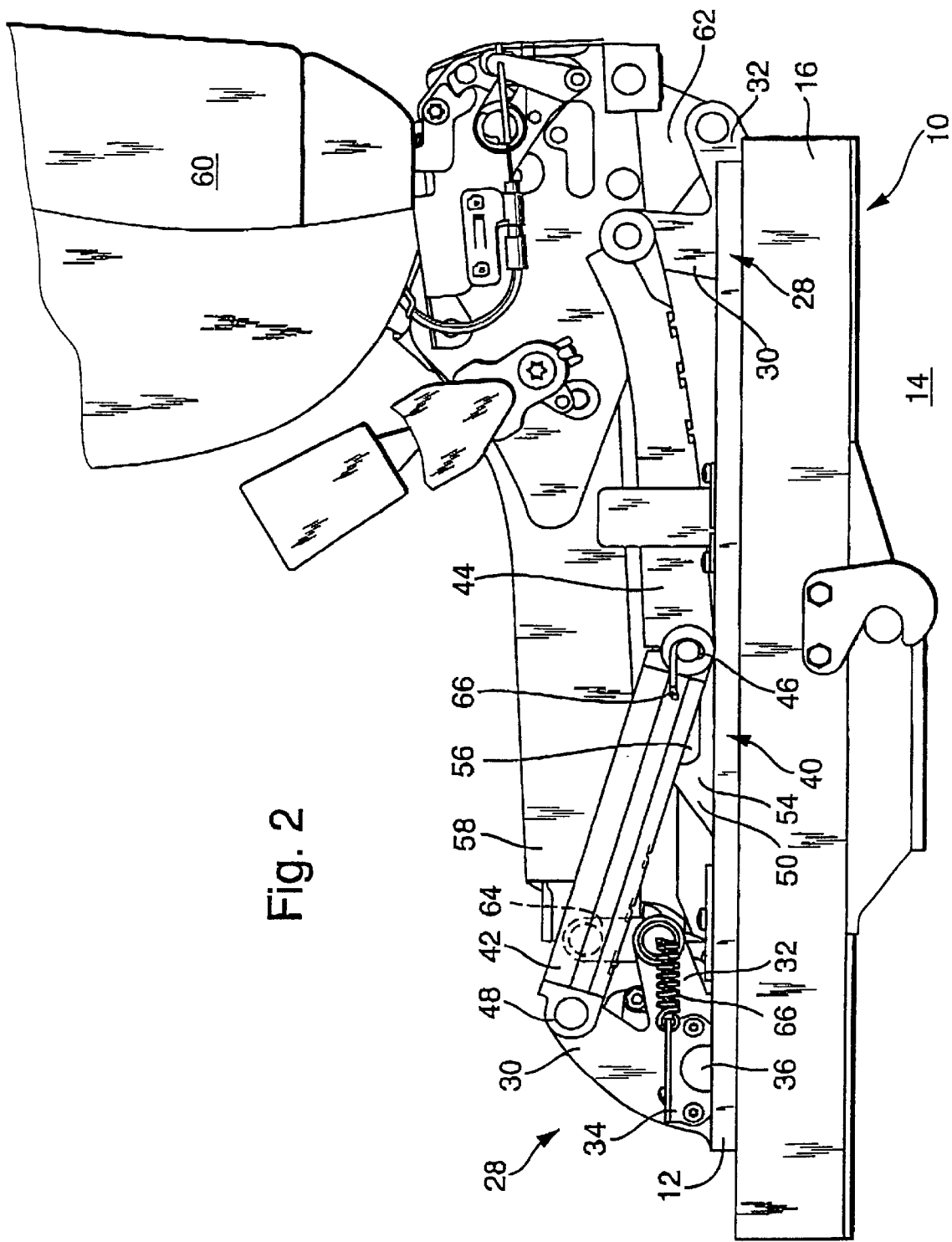
FIG. 2 is a side view of the seat underframe and a seat frame articulated by he adjusting device according to the invention.

In FIGS. 1 and 2, in a perspective and a side view, a seat underframe 10 of a vehicle is shown whose support rails 12 for lengthwise adjustment of the vehicle seat are guided in a lengthwise adjustable and lockable manner in two parallel guide rails 16 fastened on vehicle floor 14. For this purpose, a lockable shaft 20 driven by a drive motor 18 is provided between support rails 12, said shaft being mounted on support rails 12 with gears fastened to their ends which mesh with racks that are fastened to guide rails 16 (gears and racks not visible in the drawing).

In the rear area of support rails 12, on their tops 22, a rear bearing block 24 is fastened on each rail by two screw connections 26. On the rear bearing blocks 24 a control arm unit 28 is pivotally mounted which is made approximately V-shaped with a front and a rear control arm 30, 32 on each. In the forward area of each support rail 12, on its upper side 22, a front bearing block 34 is secured by two screw connections 26 each. A transverse rod 36 is rotatably received in the front bearing blocks 34, with two control arm units 28 fastened at their ends that are made essentially the same as the rear control arm units 28 already described. Transverse rod 36 is rotated by a drive motor 38 for vertical adjustment and to lock it, said motor being fastened to the support rail 12 that is on the right as viewed from the front.

The respective front control arms 30 of the front and rear V-shaped control arm units 28 located side by side are connected together by a link arrangement 40. Link arrangement 40 comprises two coupling arms 42, 44 connected with one another with articulation, with the front coupling arm 42 being articulated to the front control arm 28 and the rear coupling arm 44 being articulated to the rear control arm unit 28 on joints 48. Coupling arms 42, 44 are approximately the same length and in this case have a profile that is especially rigid, approximately closed, and approximately rectangular in cross section, which is reinforced in the area of intermediate joints 46 and joints 48. Two long coupling arms 42, 44 approximately the same length produce an especially large comfort area for the seat cushion above the link arrangement 40; however the use of coupling arms 42, 44 of different lengths would also be possible. Approximately centrally on the two support rails 12, on their tops 22, an essentially angular articulated guide 50 is fastened by two screw connections 52. In the approximately perpendicular (vertically extending) leg 54 of the two articulated guides 50, an elongate hole 56 is provided which runs parallel in the lengthwise direction to support rails 12 and extends approximately horizontally. The intermediate joint 46 is linearly displaceably guided in the holes 56 and link arrangement 40 is thereby supported on the associated support rail 12 of seat underframe 10.

As is particularly evident from FIG. 2, the vehicle seat comprises a seat frame 58 on which a seat cushion part (not shown) as well as a seat back part 60 are located. The rear control arm units 28 are connected with articulation by their rear control arm parts 32 with downwardly projecting triangular receptacles 62 of seat frame 58. The front control arm units 28 are connected with their rear control arm parts 32 by a compensating link 64 each with the front end of seat frame 58. The compensating link 64 serves in particular to compensate forces acting on seat frame 58.

The vehicle seat is shown in FIG. 2 in its approximately lowest position, with the intermediate joint 46 being located in its rearmost position in elongate hole 56 of articulated guide 50. To adjust the vehicle seat to a higher position, the transverse rod 36 driven by drive motor 38 and to be blocked is rotated accordingly counterclockwise, so that the front control arm 28 permanently connected with transverse rod 36 and, by link arrangement 40, the rear control arm 28 as well, is also pivoted counterclockwise. In other words, by link arrangement 40, coupling of the pivoting movement of the front and rear control arm units 28 is created so that the seat frame is moved backward and forward as the seat frame is moved upward or downward. In the finally set vertical position, seat frame 58 or seat cushion part and seat back part 60 are secured by the drive motor 38 which is then locked.

To support the lifting movement of seat frame 58, a coil spring 66 is provided laterally between intermediate joints 46 and the front bearing blocks 34 which is pretensioned in the lower position of seat frame 58 and the associated position of intermediate joint 46 in the rear area of elongate hole 56. Coil spring 66 is shown in both FIG. 1 and FIG. 2 only partially in the vicinity of its ends. When seat frame 58 is raised, coil springs 66 support the intermediate joint 46 and hence the entire adjusting device in its movement within elongate hole 56 in the forward direction.

FIG. 2 also indicates that intermediate joint 46, regardless of the set height of seat frame 58, is lower than joint 48 between coupling arms 42, 44 and compensating links 64 and/or seat frame 58. As a result of this V-shaped arrangement of link arrangement 40, an increase in the comfort area results, especially centrally on the seat cushion.

Figure 3:
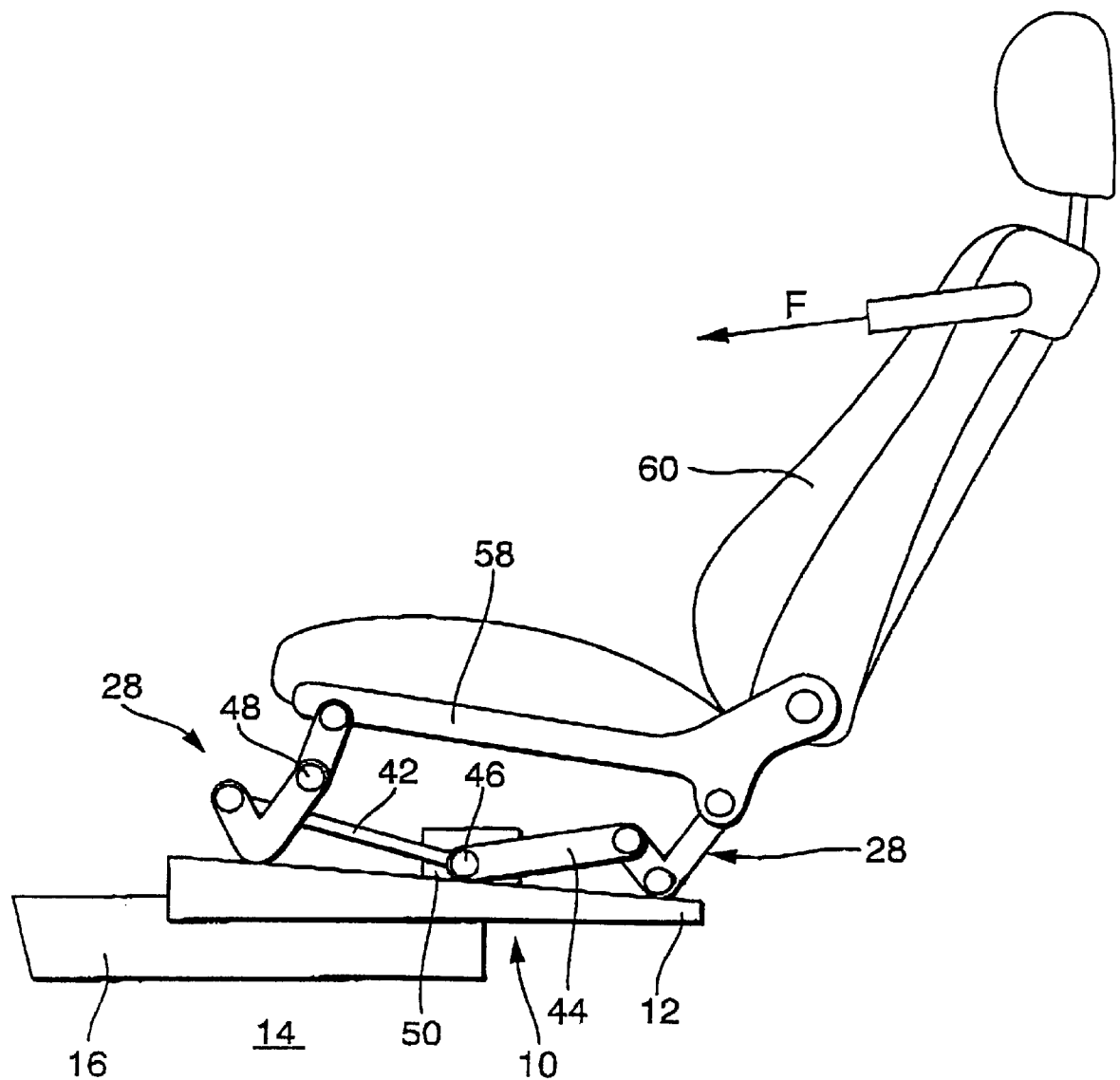
FIG. 3 is a schematic side view of the vehicle seat with a seat cushion part and a seat back part whose seat frame is articulated on the seat underframe in a vertically adjustable manner by the adjusting device according to the invention.

In FIG. 3, in a schematic side view, the vehicle seat with the seat cushion part and seat back part 60 is shown whose seat frame 58 is articulated by the adjusting device in a vertically adjustable manner on seat underframe 10. Support rails 12 preferably can be adjusted lengthwise forward or backward so that intermediate joints 46 in every lengthwise adjusted position are in the overlapping area with guide rails 16 so that link arrangements 40 are supported by the associated intermediate joints 46 in a favorable manner on seat underframe 10.

The vehicle seat shown here is designed as an integral seat, whereby the force F engaging the upper area of seat back part 60 symbolizes a tensile force of the belt, for example in an accident. As a result of this belt tensile force, the front joints 48 are subjected between the front control arm units 28 and seat frame 58 especially to a compressive force from above and the joints 48 between the rear control arm units 28 and seat frame 58 are subjected in particular to a tensile force from above. Through the respective front and rear control arm units 28, the compressive force is thus transmitted to the coupling arms 42, 44, whereby the bending moments that appear in link arrangement 40 through the intermediate joints 46 are reduced and large forces can be accepted by the relatively short coupling arms 42, 44. By supporting seat frame 58 on two additional points in the vicinity of the articulated guide 50, an adjusting device is obtained which distributes the forces that appear especially well to the seat underframe 10 and introduces them into the vehicle floor 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adjusting device for a lengthwise adjustable vehicle seat comprising:

control arm units mounted on both sides at front and rear ends on a seat underframe for vertical adjustment of the vehicle seat, with which a seat frame is articulated on the seat underframe, corresponding control arms of the front and rear control arm units being connected with one another by a respective link assembly, each said link assembly comprising two coupling arms articulated to one another at an intermediate joint which is supported so that the intermediate joint can move displaceably on the seat underframe, and a drive device operable to drive all of the control arm units in a pivotably movable fashion, wherein each of the intermediate joints is displaceably guided on the seat underframe, wherein the drive device for coupling the control arm units at opposite lateral sides of the seat comprises a transverse rod on which an associated pair of the control arm units is nonrotatably mounted, and wherein the drive device has an associated drive which is fastened to the seat underframe.

2. Adjusting device according to claim 1, wherein the seat underframe is lengthwise adjustable with respect to a vehicle floor.

3. Adjusting device according to claim 2, wherein the front and rear control arm units are rotationally mounted on one side of the seat frame and arranged on a corresponding lengthwise adjustable support rail of the seat underframe, with the intermediate joints of the link assemblies being supported on the corresponding support rail.

4. Adjusting device according to claim 3, wherein the intermediate joints are linearly displaceably guided in respective articulated guides fastened to the corresponding lengthwise adjustable support rail of the seat underframe while the support rails run in associated guide rails fastened to the vehicle floor.

5. Adjusting device according to claim 1, wherein the respective intermediate joints in each seat position are lower than joints of ends of the coupling arms facing away from the respective intermediate joint.

6. Adjusting device according to claim 3, wherein the respective intermediate joints in each seat position are lower than joints of ends of the coupling arms facing away from the respective intermediate joint.

7. Adjusting device according to claim 1, wherein the two coupling arms of the respective link assemblies are approximately the same length.

8. Adjusting device according to claim 6, wherein the two coupling arms of the respective link assemblies are approximately the same length.

9. Adjusting device according to claim 1, wherein the front control arm units are connected with the seat frame by compensating links.

10. Adjusting device according to claim 4, wherein the intermediate joints are supported in each lengthwise adjusted position of the vehicle seat in an overlapping area with the guide rails that are integral with the vehicle.

11. Adjusting device according to claim 1, wherein laterally mounted relief springs are provided to support lifting movement of the seat frame.

12. Adjusting device according to claim 11, wherein the relief springs are arranged with one respective end on the intermediate joints.

13. Adjusting device according to claim 11, wherein the relief springs are interposed between the respective front control arm unit and a respective forward one of the coupling arms.

14. Adjusting device according to claim 4, wherein the respective intermediate joints in each seat position are lower than joints of ends of the coupling arms facing away from the respective intermediate joint.

15. Adjusting device according to claim 14, wherein the two coupling arms of the respective link assemblies are approximately the same length.

16. Adjusting device according to claim 15, wherein the front control arm units are connected with the seat frame by compensating links.

17. Adjusting device according to claim 16, wherein the intermediate joints are supported in each lengthwise adjusted position of the vehicle seat in an overlapping area with the guide rails that are integral with the vehicle.

18. Adjusting device according to claim 17, wherein laterally mounted relief springs are provided to support lifting movement of the seat frame.

19. A method of making an adjustable vehicle seat having an adjustable device, comprising:

mounting control arm units on both sides at front and rear ends on a seat underframe for vertical adjustment of the vehicle seat whereby a seat frame is articulated on the seat under frame, connecting corresponding control arms of the front and rear control arm units with one another by a respective link assembly which each of the link assemblies comprises two couplings arms articulated to one another at an intermediate joint, supporting the intermediate joints so that the intermediate joints can move displaceably on the seat under frame, providing a drive device operable to drive all of the control arm units in a pivotably movable fashion, and nonrotatably mounting an associated pair of the control arm units on a transverse rod which is part of the drive device for coupling the control arm units at opposite lateral sides of the vehicle seat wherein each of the intermediate joints is displaceably guided on the seat underframe, and wherein the drive device has an associated drive which is fastened to the seat underframe.

\* \* \* \* \*